United States Patent
Tang

(10) Patent No.: US 11,582,011 B2
(45) Date of Patent: Feb. 14, 2023

(54) METHOD FOR CONFIGURING SCHEDULING REQUEST, NETWORK DEVICE AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/646,107

(22) PCT Filed: Sep. 15, 2017

(86) PCT No.: PCT/CN2017/101866
§ 371 (c)(1),
(2) Date: Mar. 10, 2020

(87) PCT Pub. No.: WO2019/051766
PCT Pub. Date: Mar. 21, 2019

(65) Prior Publication Data
US 2020/0280423 A1   Sep. 3, 2020

(51) Int. Cl.
*H04W 76/27* (2018.01)
*H04L 5/00* (2006.01)
(Continued)

(52) U.S. Cl.
CPC .......... *H04L 5/0092* (2013.01); *H04L 1/0027* (2013.01); *H04L 1/1642* (2013.01);
(Continued)

(58) Field of Classification Search
CPC ................. H04L 5/0044; H04L 5/0092; H04L 5/0094; H04L 5/0098; H04W 72/042;
(Continued)

(56) References Cited

U.S. PATENT DOCUMENTS

2018/0199343 A1* 7/2018 Deogun ................ H04L 5/0094
2018/0368156 A1* 12/2018 Agiwal ............. H04W 72/1242
(Continued)

FOREIGN PATENT DOCUMENTS

| CN | 101980575 A | 2/2011 |
|---|---|---|
| CN | 103548405 A | 1/2014 |
| CN | 107040351 A | 8/2017 |

OTHER PUBLICATIONS

ZTE. "Consideration on the SR in NR"; 3GPP TSG-RAN WG2 #99 R2-1708146, Aug. 25, 2017 (Aug. 25, 2017), sections 1-2.
(Continued)

*Primary Examiner* — Harun Chowdhury
(74) *Attorney, Agent, or Firm* — Perkins Coie LLP

(57) ABSTRACT

Disclosed are a method for configuring a scheduling request, a network device, a terminal device, and a computer storage medium. The method comprises: receiving at least one bandwidth part (BWP) configured by a network side; and receiving configuration parameters of at least one scheduling request configured by the network side for each BWP, wherein the configuration parameters of the scheduling request have a mapping relationship with a logical channel.

12 Claims, 3 Drawing Sheets

(51) Int. Cl.
H04L 1/00 (2006.01)
H04L 1/1607 (2023.01)
(52) U.S. Cl.
CPC .......... H04L 5/0094 (2013.01); H04L 5/0098 (2013.01); H04W 76/27 (2018.02)
(58) Field of Classification Search
CPC .......... H04W 72/044; H04W 72/0453; H04W 76/27; H04W 72/1242
USPC ........................................ 370/238, 252, 329
See application file for complete search history.

(56) References Cited

U.S. PATENT DOCUMENTS

2019/0387578 A1* 12/2019 Shrestha ............... H04L 5/0094
2020/0275417 A1* 8/2020 Takeda ................ H04W 72/042

OTHER PUBLICATIONS

Guangdong OPPO Mobile Telecom. "Bandwidth Part Based Resource Scheduling for Carrier Aggregation"; 3GPP TSG RAN WG1 NR Ad-Hoc#2 R1-1710171, Jun. 30, 2017 (Jun. 30, 2017), entire document.
Guangdong OPPO Mobile Telecom. "Bandwidth Part Configuration and Frequency Resource Allocation"; 3GPP TSG RAN WG1 NR Ad-Hoc#2 R1-1710164, Jun. 30, 2017 (Jun. 30, 2017), entire document.
International Search Report in the international application No. PCT/CN2017/101866, dated Jun. 11, 2018.
Samsung: "Procedures for UL Transmissions", 3GPP Draft; R1-1716007—Procedures for UL Transmission, 3rd Generation Partnership Project (3GPP), Mobile Competence Centre; 650, Route Des Lucioles ; F-06921 Sophia-Antipolis Cedex; France, vol. RAN WG1, No. Nagoya, Japan; Sep. 18, 2017-Sep. 21, 2017 Sep. 12, 2017 (Sep. 12, 2017), XP051329672, [retrieved on Sep. 12, 2017] chapters 2.1 and 2.3.
CATT: "Grant-based and grant-free UL transmission procedures", 3GPP Draft; R1-1715827, 3rd Generation Partnership Project (3GPP), Mobile Competence Centre; 650, Route Des Lucioles ; F-06921 Sophia-Antipolis Cedex; France, vol. RAN WG1, No. Nagoya, Japan; Sep. 18, 2017-Sep. 21, 2017 Sep. 12, 2017 (Sep. 12, 2017), XP051329519, XP051329519, [retrieved on—Sep. 12, 2017] chapter 2.
CATT: "Remaining details of wider bandwidth operation", 3GPP Draft; R1-1712427 NR Largesystembw, 3rd Generation Partners-Hip Project (3GPP), Mobile Competence Centre; 650, Route Des Lucioles; F-06921 Sophia-Antipolis Cedex; France, vol. RAN WG1, No. Prague, Czechia; Aug. 21, 2017-Aug. 25, 2017 Aug. 20, 2017 (Aug. 20, 2017), XP051315243, [retrieved on Aug. 20, 2017] chapter 2.

Supplementary International Search Report in the international application No. PCT/CN2017/101866, dated Dec. 6, 2019.
ETSI MCC, "Report of 3GPP TSG RAN2#99 meeting, Berlin, Germany", 3GPP TSG-RAN WG2 meeting #99bis R2-1710001, Prague, Czech Republic, Oct. 9-13, 2017.
English translation of the Written Opinion of the International Search Authority in the international application No. PCT/CN2017/101866, dated Jun. 8, 2018.
Guangdong OPPO Mobile Telecom: "Remaining issues on bandwidth part configuration and activation", 3GPP Draft; R1-1715692, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, XP051329144.
First Office Action of the European application No. 17925334.9, dated Feb. 17, 2021.
Office Action of the Indian application No. 202017015762, dated Jun. 1, 2021. 6 pages.
Qualcomm Incorporated, CA and BWP, 3GPP TSG RAN WG1 adhoc_NR_AH_1709 R1-1716440, Sep. 12, 2017, <URL:http://www.3gpp.org/ftp/tsg_ran/WG1_RL1/TSGR1_AH/NR_AHL_1709/Docs/R1-1716440.zip>. 7 pages.
First Office Action of the Japanese application No. 2020-515153, dated Jul. 6, 2021. 8 pages with English translation.
First Office Action of the Chinese application No. 201780091688.0, dated Jun. 10, 2021. 12 pages with English translation.
Second Office Action of the Chinese application No. 201780091688.0, dated Aug. 18, 2021. 7 pages with English translation.
First Office Action of the Korean application No. 10-2020-7010906, dated Oct. 25, 2021. 10 pages with English translation.
Subsequent Examination Report of the Indian application No. 202017015762, dated Oct. 29, 2021. 2 pages.
3GPP TSG RAN WG1 Meeting #90 R1-1712155,Huawei, HiSilicon,Bandwidth part activation and adaptation,Prague, Czech Republic, Aug. 21-25, 2017. 6 pages.
3GPP TSG-RAN WG1 NR Ad-Hoc#2 R1-1711989,[Draft] LS on Bandwidth Part Operation in NR,Qingdao, P.R. China, Jun. 27-30, 2017. 3 pages.
Third Office Action of the Chinese application No. 201780091688.0, dated Nov. 12, 2021. 9 pages with English translation.
Decision of Refusal of the Japanese application No. 2020-515153, dated Feb. 15, 2022. 7 pages with English translation.
Vivo, "BSR and SR and BSR cancel due to deactivation of LCH", 3GPP TSG-RAN WG2 Meeting#99 R2-1708490, Berlin, Germany, Aug. 21-25, 2017. 2 pages.
3GPP "3rd Generation Partnership Project; Technical Specification Group Radio Access Network; NR; Medium Access Control (MAC) protocol specification (Release 15)", 3GPP Standard; Technical Specification; 3GPP TS 38.321, vol. RAN WG2, No. V0.3.0, Sep. 4, 2017. 46 pages. Chapter 5.4.4, chapter Y.3 on p. 44.

* cited by examiner

METHOD FOR CONFIGURING SCHEDULING REQUEST, NETWORK DEVICE AND TERMINAL DEVICE

CROSS-REFERENCE TO RELATED APPLICATIONS

The present application is a U.S. National Phase Entry of International PCT Application No. PCT/CN2017/101866 filed on Sep. 15, 2017, and named after "METHOD FOR CONFIGURING SCHEDULING REQUEST, NETWORK DEVICE AND TERMINAL DEVICE", the content of which is hereby incorporated by reference in its entirety.

TECHNICAL FIELD

The disclosure relates to the technical field of information processing, and particularly to a method for configuring a scheduling request, a network device, a terminal device and a computer storage medium.

BACKGROUND

An LTE scheduling request (SR) is a message of 1 bit, which is transmitted by a terminal on a physical uplink control channel (PUCCH) for requesting uplink authorized resources. One or more SR configurations may be configured by an MAC entity corresponding to a terminal. Multiple SR configurations are configured to ensure that secondary cells (SCells) have SR configurations corresponding to the secondary cells in carrier aggregation (CA). In the new radio (NR) discussion, multiple SR configurations are allowable for one MAC entity of user equipment (UE), even in a single carrier.

In addition, a system bandwidth supported in NR is far greater than a maximum system bandwidth of 20 MHz of the LTE. For some terminal, not all system bandwidths may be supported due to limited capabilities of the terminal. Further, in order to improve scheduling efficiency, the concept of BandWidth Part (BWP) is introduced in NR. The BWP is only a concept in the dimension of frequency domain. Moreover, it is assumed in existing discussions that a terminal supports only one activated BWP at the same time. However, in such a scenario, a problem to be solved is how to ensure that UE can correctly send an SR even if a mapping relationship is invalid when the single-carrier user equipment switches the BWP.

SUMMARY

In order to solve the above technical problems, a method for configuring a scheduling request, a network device, a terminal device and a computer storage medium are provided according to the embodiments of the disclosure.

A method for configuring a scheduling request is provided according to an embodiment of the disclosure, which is applied to a terminal device and includes the following operations.

At least one bandwidth part (BWP) configured by a network side is received. At least one scheduling request configuration configured by the network side for each of the at least one BWP is received. The scheduling request configuration has a mapping relationship with a logical channel.

A method for configuring a scheduling request is provided according to an embodiment of the disclosure, which is applied to a network device and includes the following operations.

At least one bandwidth part (BWP) is configured for a terminal device.

At least one scheduling request configuration is configured for each BWP of the at least one BWP. The scheduling request configuration has a mapping relationship with a logical channel.

A terminal device is provided according to an embodiment of the disclosure, which include a first receiving unit and a second receiving unit.

The first receiving unit is configured to receive at least one bandwidth part (BWP) configured by a network side.

The second receiving unit is configured to receive at least one scheduling request configuration configured for each of the BWP by the network side. The scheduling request configuration has a mapping relationship with a logical channel.

A network device is provided according to an embodiment of the disclosure, which includes a first configuring unit and a second configuring unit.

The first configuring unit is configured to configure at least one bandwidth part (BWP) for a terminal device.

The second configuring unit is configured to configure at least one scheduling request configuration for each of the at least one BWP. The scheduling request configuration has a mapping relationship with a logical channel.

A network device is provided according to an embodiment of the disclosure, which includes a processor and a memory configured to store a computer program capable of being run in the processor.

Herein, the processor may be configured to, when running the computer program, executes steps of the abovementioned method.

A terminal device is provided according to an embodiment of the disclosure, which includes a processor and a memory configured to store a computer program capable of being run in the processor.

Herein, the processor is configured to, when running the computer program, executes steps of the abovementioned method.

A computer storage medium is provided according to an embodiment of the disclosure, in which a computer-executable instruction is stored. The computer-executable instruction implements steps of the abovementioned method when being executed.

With the technical solutions according to the embodiments of the disclosure, multiple BWPs configured by a network for the terminal device may be received, multiple scheduling request configurations may be configured for each of the BWPs correspondingly, and each scheduling request configuration has a mapping relationship with the logical channel. In this way, the terminal device can correctly send an SR even if the mapping relationship is invalid when the terminal device switches the BWP, thereby ensuring system processing efficiency.

DETAILED DESCRIPTION

In order to make characteristics and technical contents of the embodiments of the disclosure be understood in more detail, implementation of the embodiments of the disclosure is described in detail below in combination with the drawings. The drawings are only used as a reference for description, and not intended to limit the embodiments of the disclosure.

First Embodiment

Figure 1:
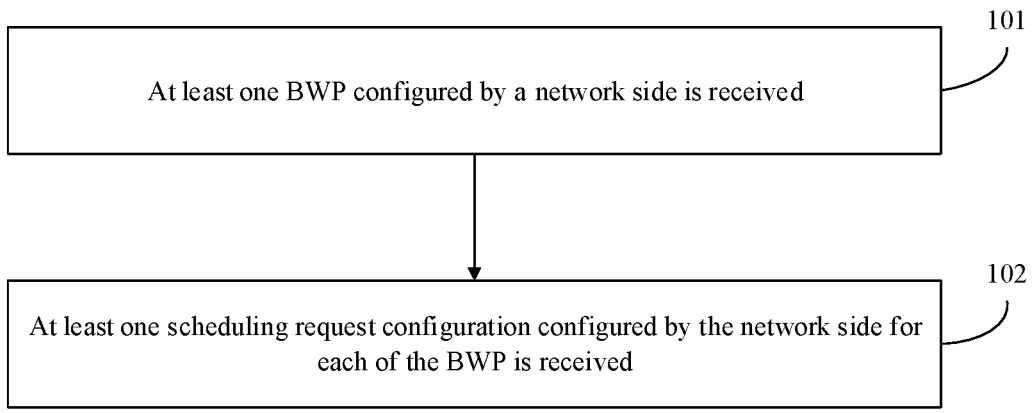
FIG. 1 is a first flowchart of a method for configuring a scheduling request according to an embodiment of the disclosure.

A method for configuring a scheduling request is provided in the application, which is applied to a terminal device, and includes steps 101 to 102 as shown in FIG. 1.

In step 101, at least one BWP configured by a network side is received.

In step 102, at least one scheduling request configuration configured by the network side for each of the BWP is received. The scheduling request configuration has a mapping relationship with a logical channel.

Herein, the BWP is a concept in the dimension of frequency domain. Specifically, the network side (or a network device) may configure one or more BWPs for the terminal in a connection state of the radio resource control (RRC). The BWP may include the three following parameters: Numerology indicating a basic parameter set and indicating a carrier spacing (SCS), a center frequency point and a bandwidth. Herein, the bandwidth is less than or equal to a maximum system bandwidth.

The number of at least one BWP configured by the network side may be equal to or greater than one. For example, two or three BWPs may be configured by the network side, that is, the terminal device may be switched among the BWPs.

The scheduling request configuration (SR configuration) may include a time-domain resource, a frequency-domain resource, a scheduling request transmission number and other parameter.

For example, RRC signaling of each SR configuration is configured as follows.

```
SchedulingRequestConfig ::=      CHOICE {
    release                          NULL,
    setup                            SEQUENCE {
        sr-PUCCH-ResourceIndex           INTEGER (0 . . . 2047),
        sr-ConfigIndex                   INTEGER (0 . . . 157),
        dsr-TransMax                     ENUMERATED {
                                             n4, n8, n16, n32, n64, spare3,
spare2, spare1}
    }
}
```

Herein, sr-PUCCH-ResourceIndex indicates a frequency resource of UE for transmitting an SR, and the description following sr-PUCCH-ResourceIndex represents that the field is an integer ranging from 0 to 2047; sr-ConfigIndex indicates a time-domain resource of the PUCCH for transmitting the SR, and a value of sr-ConfigIndex is an integer ranging from 0 to 157; and dsr-TransMax represents a maximum scheduling request transmission number.

It should be noted that the order for executing step 101 and step 102 may be not limited. That is, step 101 and step 102 may be executed simultaneously.

Specifically, after executing step 101 and step 102, the terminal device may obtain multiple BWPs configured by a network and the at least one scheduling request configuration (SR Configuration) corresponding to each of the BWPs. In addition, each SR Configuration may correspond to one or more logical channels. It is further noted that each logical channel may correspond to at most one SR Configuration.

For example, referring to Table 1, the network pre-configures a mapping relationship between logical channels and SR configurations corresponding to different BWPs. For example, as shown below, BWP-A corresponds to two SR configurations, BWP-B corresponds to three SR configurations and BWP-C corresponding to one SR configuration.

TABLE 1

| Logical Channel | BWP-A | BWP-B | BWP-C |
| --- | --- | --- | --- |
| LCH1 | SR-CONFIG-A-i | SR-CONFIG-B-i | SR-CONFIG-C-i |
| LCH2 | SR-CONFIG-A-i | SR-CONFIG-B-ii | SR-CONFIG-C-i |
| LCH3 | SR-CONFIG-A-ii | SR-CONFIG-B-iii | SR-CONFIG-C-i |

Figure 2:
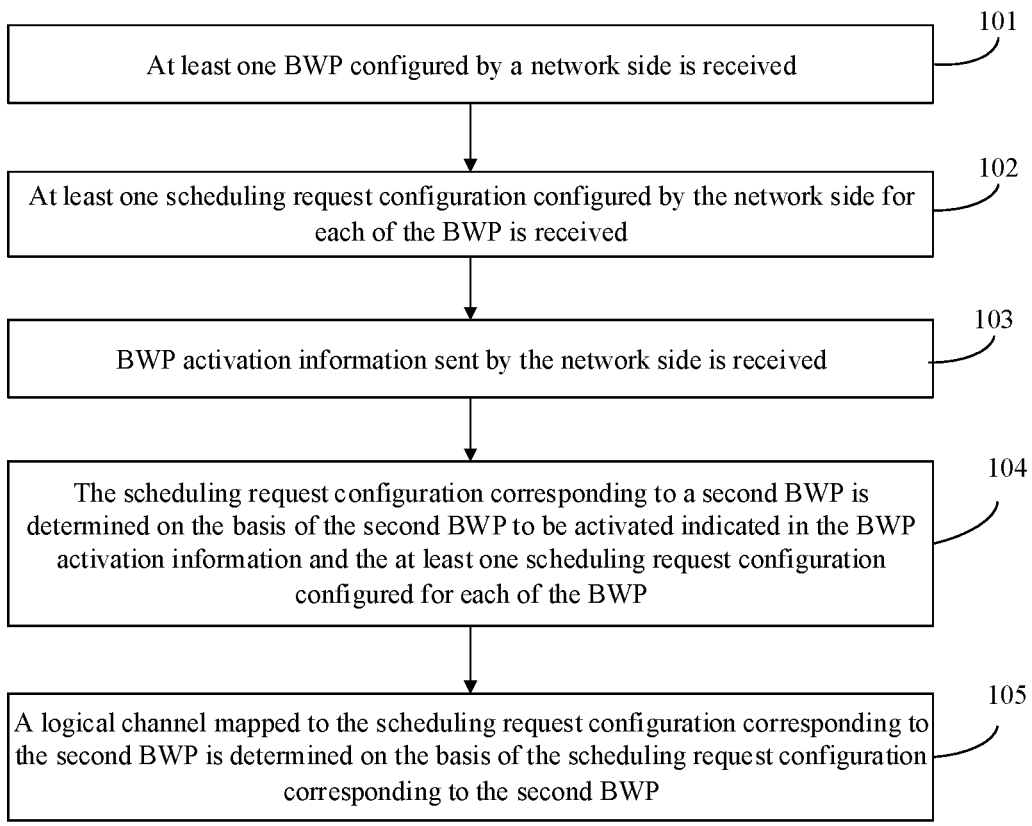
FIG. 2 is a second flowchart of a method for configuring a scheduling request according to an embodiment of the disclosure.

After the above steps are executed, on the basis of the flow shown in FIG. 1, the embodiment may further include step 103, as shown in FIG. 2. In Step 103, BWP activation information sent by the network side is received.

Herein, the BWP activation information is used to deactivate a first BWP currently used by the terminal device and activate a second BWP in the at least one BWP configured for the terminal device. The first BWP is different from the second BWP.

For example, in Table 1, upon receiving a BWP activation signaling, the terminal adopts a pre-configured mapping relationship between the logical channels and the SR configurations according to whether the activated BWP is BWP-A, BWP-B or BWP-C.

It can be seen from the steps, before step 103, that is before the BWP activation information sent by the network side is received, the terminal device may acquire all configuration relationships as shown in Table 1. That is, the terminal device may acquire the mapping relationship between the logical channels and the scheduling request configurations and a mapping relationship between scheduling request configurations and BWPs in advance.

Furthermore, as shown in FIG. 2, after step 103, the method may further include the following steps 104 and 105.

In step 104, the scheduling request configuration corresponding to the second BWP is determined on the basis of the second BWP to be activated indicated in the BWP activation information and the at least one scheduling request configuration configured for each of the BWP.

In step 105, the logical channel mapped to the scheduling request configuration corresponding to the second BWP is determined on the basis of the scheduling request configuration corresponding to the second BWP.

That is, upon receiving the bandwidth part (BWP) activation instruction, the terminal updates the mapping relationship between the logical channels and the SR configurations based on the activation information or RRC configuration information, and the terminal sends an SR based on the updated mapping relationship.

According to the above embodiment, it can be seen that the terminal device is configured with multiple BWPs, and multiple SR configurations are configured for a BWP. For an activated BWP, the network configures a mapping relationship between logical channels and SR configurations for the terminal, and the activated BWP includes a BWP using which the terminal device sends and receives data at a current moment.

Furthermore, a mapping relationship between the logical channels and the SR configurations may be shown in Table 2. For example, the terminal has logical channels LCH1, LCH2 and LCH3, and SR-CONFIG a and SR-CONFIG b.

TABLE 2

| | |
|---|---|
| LCH1 | SR-CONFIG a |
| LCH2 | SR-CONFIG a |
| LCH3 | SR-CONFIG b |

Upon receiving the BWP activation signaling, the terminal deactivates the current BWP (i.e., the first BWP) based on the instruction, and meanwhile, activates another BWP (i.e., the second BWP). The another BWP is indicated by the activation signaling. In addition, the terminal updates a mapping relationship between the logical channel and a new SR configuration based on the BWP activation signaling. The new SR configuration corresponds to a new BWP to be activated indicated by the activation signaling. The mapping relationship is updated in three manners as follows: pre-configuration, RRC dedicated signaling modification and SR configuration.

Furthermore, after the operation that the logical channel mapped to the scheduling request configuration corresponding to the second BWP is determined on the basis of the scheduling request configuration of the second BWP, the method further includes the following operation.

When reporting for a scheduling request is triggered in the logical channel, a physical uplink channel resource corresponding to the logical channel is selected on the basis of the scheduling request configuration mapped to the logical channel corresponding to the second BWP, and the SR is sent on the selected physical uplink channel resource.

That is, when reporting for an SR is triggered in a logical channel, the terminal selects a PUCCH resource corresponding to the logical channel using the SR configuration mapped to the logical channel on the basis of the mapping relationship between the logical channels and the SR configurations, and sends the SR on the selected PUCCH resource.

It can be seen that, with the above solution, multiple BWPs configured by a network for the terminal device may be received, and multiple scheduling request configurations may be configured for each of the BWPs correspondingly. Each scheduling request configuration has a mapping relationship with the logical channel. In this way, the terminal device can correctly send an SR even if the mapping relationship is invalid when the terminal device switches the BWP, thereby ensuring system processing efficiency.

Second Embodiment

Figure 3:
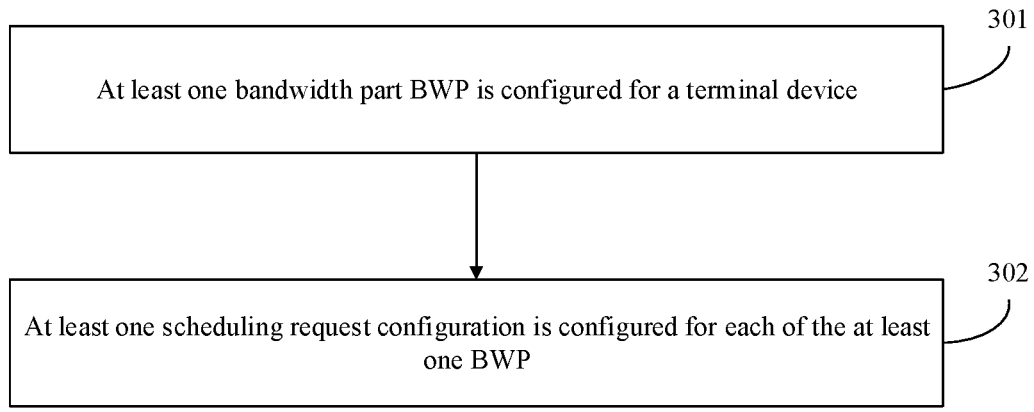
FIG. 3 is a third flowchart of a method for configuring a scheduling request according to an embodiment of the disclosure.

A method for configuring a scheduling request is provided according to the application, which is applied to a network device, and includes steps 301 to 302 as shown in FIG. 3.

In step 301, at least one BWP is configured for a terminal device.

In step 302, at least one scheduling request configuration is configured for each of the at least one BWP. The scheduling request configuration has a mapping relationship with a logical channel.

Herein, the BWP is a concept in the dimension of frequency domain.

Specifically, the network side (or a network device) may configure one or more BWPs for the terminal in a connection state of the RRC. The BWP may include the following three parameters: Numerology indicating a basic parameter set and indicating a carrier spacing (SCS), a center frequency point and a bandwidth. Herein, the bandwidth is less than or equal to a maximum system bandwidth.

The number of at least one BWP configured by the network side may be equal to or greater than one. For example, two or three BWPs may be configured by the network side, that is, the terminal device may be switched among the BWPs.

The scheduling request configuration (SR configuration) may include a time-domain resource, a frequency-domain resource, a scheduling request transmission number and other parameter.

For example, RRC signaling of each SR configuration is configured as follows.

| | |
|---|---|
| SchedulingRequestConfig ::= | CHOICE { |
| release | NULL, |
| setup | SEQUENCE { |
| sr-PUCCH-ResourceIndex | INTEGER (0 . . . 2047), |
| sr-ConfigIndex | INTEGER (0 . . . 157), |
| dsr-TransMax | ENUMERATED { |
| | n4, n8, n16, n32, n64, spare3, spare2, spare1} |
| | } |
| } | |

Herein, sr-PUCCH-ResourceIndex indicates a frequency resource of UE for transmitting an SR, and the description following sr-PUCCH-ResourceIndex represents that the field is an integer ranging from 0 to 2047; sr-ConfigIndex indicates a time-domain resource of the PUCCH for transmitting the SR, and a value of sr-ConfigIndex is an integer ranging from 0 to 157; and dsr-TransMax represents a maximum scheduling request transmission number.

It should be noted that the order for executing step 301 and step 302 may be not limited. That is, step 301 and step 302 may be executed simultaneously.

Specifically, after executing step 301 and step 302, the terminal device may be configured with multiple BWPs, and each of the BWPs corresponds to the at least one scheduling request configuration (SR Configuration). In addition, each SR Configuration may correspond to one or more logical channels. Further, each logical channel may correspond to at most one SR Configuration.

For example, referring to Table 1, the network pre-configures a mapping relationship between LCHs and SR configurations corresponding to the BWP when configuring the BWP for the terminal.

For example, the network configures for the terminal three BWPs, i.e., BWP-A, BWP-B and BWP-C.

The network pre-configures a mapping relationship between logical channels and SR configurations corresponding to different BWPs. For example, as shown below, BWP-A corresponds to two SR configurations, BWP-B corresponds to three SR configurations and BWP-C corresponding to one SR configuration.

TABLE 1

| Logical Channel | BWP-A | BWP-B | BWP-C |
| --- | --- | --- | --- |
| LCH1 | SR-CONFIG-A-i | SR-CONFIG-B-i | SR-CONFIG-C-i |
| LCH2 | SR-CONFIG-A-i | SR-CONFIG-B-ii | SR-CONFIG-C-i |
| LCH3 | SR-CONFIG-A-ii | SR-CONFIG-B-iii | SR-CONFIG-C-i |

After the steps are executed, the method further includes an operation that BWP activation information is sent to the terminal device.

Herein, the BWP activation information is used to deactivate a first BWP currently used by the terminal device and activate a second BWP in the at least one BWP configured for the terminal device. The first BWP is different from the second BWP.

It can be seen from the above steps, before the BWP activation information is sent, the terminal device may acquire all configuration relationships as shown in Table 1. That is, the terminal device may acquire the mapping relationship between the logical channels and the scheduling request configurations and a mapping relationship between scheduling request configurations and BWPs in advance.

Furthermore, the operation that the BWP activation information is sent to the terminal device includes one of the following operations.

The BWP activation information is sent to the terminal device through radio resource control (RRC) dedicated configuration signaling.

The BWP activation information is sent to the terminal device through downlink control information (DCI).

The BWP activation information is sent to the terminal device through a control element (CE) of a media access control (MAC) layer.

The BWP activation information is sent to the terminal device in a preset information format.

Correspondingly, after the activation information is sent, when reporting for an SR is triggered in a logical channel, the terminal device may select a PUCCH resource corresponding to the logical channel using the SR configuration mapped to the logical channel on the basis of the mapping relationship between the logical channels and the SR configurations, and send the SR on the selected PUCCH resource.

It can be seen that, with the above solution, multiple BWPs configured by a network for the terminal device may be received, and multiple scheduling request configurations may be configured for each of the BWPs correspondingly. Each scheduling request configuration has a mapping relationship with the logical channel. In this way, the terminal device can correctly send an SR even if the mapping relationship is invalid when the terminal device switches the BWP, thereby ensuring system processing efficiency.

Third Embodiment

Figure 4:
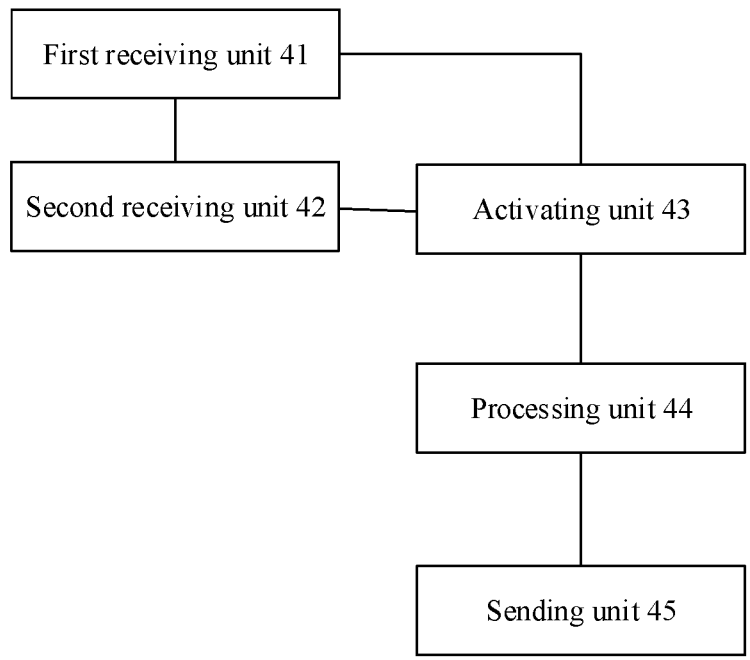
FIG. 4 is a schematic diagram showing a composition structure of a terminal device according to an embodiment of the disclosure.

A terminal device is provided according to the application, which includes a first receiving unit 41 and a second receiving unit 42 as shown in FIG. 4.

The first receiving unit 41 is configured to receive at least one BWP configured by a network side.

The second receiving unit 42 is configured to receive at least one scheduling request configuration configured by the network side for each of the BWP. The scheduling request configuration has a mapping relationship with a logical channel.

Herein, the BWP is a concept in the dimension of frequency domain. Specifically, the network side (or a network device) may configure one or more BWPs for the terminal in a connection state of the RRC. The BWP may include the three following parameters: Numerology indicating a basic parameter set and indicating a carrier spacing (SCS), a center frequency point and a bandwidth. Herein, the bandwidth is less than or equal to a maximum system bandwidth.

The number of at least one BWP configured by the network side may be equal to or greater than one. For example, two or three BWPs may be configured by the network side, that is, the terminal device may be switched among the BWPs.

The scheduling request configuration (SR configuration) may include a time-domain resource, a frequency-domain resource, a scheduling request transmission number and other parameter.

For example, RRC signaling of each SR configuration is configured as follows.

```
SchedulingRequestConfig ::=     CHOICE {
    release                     NULL,
    setup                       SEQUENCE {
        sr-PUCCH-ResourceIndex      INTEGER (0 . . . 2047),
        sr-ConfigIndex              INTEGER (0 . . . 157),
        dsr-TransMax                ENUMERATED {
                                    n4, n8, n16, n32, n64, spare3,
spare2, spare1}
        }
    }
```

Herein, sr-PUCCH-ResourceIndex indicates a frequency resource of UE for transmitting an SR, and the description following sr-PUCCH-ResourceIndex represents that the field is an integer ranging from 0 to 2047; sr-ConfigIndex indicates a time-domain resource of the PUCCH for transmitting the SR, and a value of sr-ConfigIndex is an integer ranging from 0 to 157; and dsr-TransMax represents a maximum scheduling request transmission number.

Specifically, after the above operations, multiple BWPs configured by a network and the at least one scheduling request configuration (SR Configuration) corresponding to each of the BWPs may be obtained. In addition, each SR Configuration may correspond to one or more logical channels. Further, each logical channel may correspond to at most one SR Configuration.

For example, referring to Table 1, the network preconfigures a mapping relationship between logical channels and SR configurations corresponding to different BWPs. For example, as shown below, BWP-A corresponds to two SR configurations, BWP-B corresponds to three SR configurations and BWP-C corresponding to one SR configuration.

TABLE 1

| Logical Channel | BWP-A | BWP-B | BWP-C |
| --- | --- | --- | --- |
| LCH1 | SR-CONFIG-A-i | SR-CONFIG-B-i | SR-CONFIG-C-i |
| LCH2 | SR-CONFIG-A-i | SR-CONFIG-B-ii | SR-CONFIG-C-i |
| LCH3 | SR-CONFIG-A-ii | SR-CONFIG-B-iii | SR-CONFIG-C-i |

The terminal device further includes an activating unit 43.

The activating unit 43 is configured to receive BWP activation information sent by the network side.

Herein, the BWP activation information is used to deactivate a first BWP currently used by the terminal device and activate a second BWP in the at least one BWP configured for the terminal device. The first BWP is different from the second BWP.

For example, in Table 1, upon receiving BWP activation signaling, the terminal adopts a pre-configured mapping relationship between the logical channels and the SR configurations according to whether the activated BWP is BWP-A, BWP-B or BWP-C.

It can be seen from the steps, before the BWP activation information sent by the network side is received, the terminal device may acquire all configuration relationships as shown in Table 1. That is, the terminal device may acquire a mapping relationship between the logical channels and the scheduling request configurations and a mapping relationship between scheduling request configurations and BWPs in advance.

The terminal device further includes a processing unit 44.

The processing unit 44 is configured to determine the scheduling request configuration corresponding to the second BWP on the basis of the second BWP to be activated indicated in the BWP activation information and the at least one scheduling request configuration configured for each of the BWP, and determine the logical channel mapped to the scheduling request configuration corresponding to the second BWP on the basis of the scheduling request configuration corresponding to the second BWP.

That is, upon receiving the bandwidth part (BWP) activation instruction, the terminal updates the mapping relationship between the logical channels and the SR configurations based on the activation information or RRC configuration information, and the terminal sends an SR based on the updated mapping relationship.

According to the above embodiment, it can be seen that the terminal device is configured with multiple BWPs, and multiple SR configurations are configured for a BWP. For an activated BWP, the network configures a mapping relationship between logical channels and SR configurations for the terminal, and the activated BWP includes a BWP using which the terminal device sends and receives data at a current moment.

Furthermore, a mapping relationship between the logical channels and the SR configurations may be shown in Table 2. For example, the terminal has logical channels LCH1, LCH2 and LCH3, and SR-CONFIG a and SR-CONFIG b.

TABLE 2

| LCH1 | SR-CONFIG a |
|------|-------------|
| LCH2 | SR-CONFIG a |
| LCH3 | SR-CONFIG b |

Upon receiving the BWP activation signaling, the terminal deactivates the current BWP (i.e., the first BWP) based on the instruction, and meanwhile, activates another BWP (i.e., the second BWP). The another BWP is indicated by the activation signaling. In addition, the terminal updates a mapping relationship between the logical channel and a new SR configuration based on the BWP activation signaling. The new SR configuration corresponds to a new BWP to be activated indicated by the activation signaling. The mapping relationship is updated in three manners as follows: pre-configuration, RRC dedicated signaling modification and SR configuration.

The terminal device further includes a sending unit 45.

The sending unit 45 is configured to send an SR.

Correspondingly, the processing unit 44 is configured to, when reporting for an SR is triggered in the logical channel, select a physical uplink channel resource corresponding to the logical channel on the basis of the scheduling request configuration mapped to the logical channel corresponding to the second BWP, and send the SR on the selected physical uplink channel resource.

That is, when reporting for an SR is triggered in a logical channel, the terminal selects a PUCCH resource corresponding to the logical channel using the SR configuration mapped to the logical channel on the basis of the mapping relationship between the logical channels and the SR configurations, and sends the SR on the selected PUCCH resource.

It can be seen that, with the above solution, multiple BWPs configured by a network for the terminal device may be received, and multiple scheduling request configurations may be configured for each of the BWPs correspondingly. Each scheduling request configuration has a mapping relationship with the logical channel. In this way, the terminal device can correctly send an SR even if the mapping relationship is invalid when the terminal device switches the BWP, thereby ensuring system processing efficiency.

Fourth Embodiment

Figure 5:
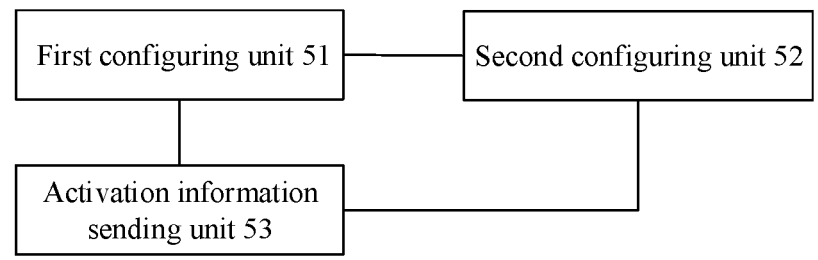
FIG. 5 is a schematic diagram showing a composition structure of a network device according to an embodiment of the disclosure.

A network device is provided according to the application, which includes a first configuring unit 51 and a second configuring unit 52, as shown in FIG. 5.

The first configuring unit 51 is configured to configure at least one bandwidth part (BWP) for a terminal device.

The second configuring unit 52 is configured to configure at least one scheduling request configuration for each of the at least one BWP. The scheduling request configuration has a mapping relationship with a logical channel.

Herein, the BWP is a concept in the dimension of frequency domain. Specifically, the network side (or a network device) may configure one or more BWPs for the terminal in a connection state of the RRC. The BWP may include the following three parameters: Numerology indicating a basic parameter set and indicating a carrier spacing (SCS), a center frequency point and a bandwidth. Herein, the bandwidth is less than or equal to a maximum system bandwidth.

The number of at least one BWP configured by the network side may be equal to or greater than one. For example, two or three BWPs may be configured by the network side, that is, the terminal device may be switched among the BWPs.

The scheduling request configuration (SR configuration) may include a time-domain resource, a frequency-domain resource, a scheduling request transmission number and other parameter.

For example, RRC signaling of each SR configuration is configured as follows.

```
SchedulingRequestConfig ::=      CHOICE {
    release                          NULL,
    setup                            SEQUENCE {
        sr-PUCCH-ResourceIndex           INTEGER (0 . . . 2047),
        sr-ConfigIndex                   INTEGER (0 . . . 157),
        dsr-TransMax                     ENUMERATED {
                                             n4, n8, n16, n32, n64, spare3,
spare2, spare1}
    }
}
```

Herein, sr-PUCCH-ResourceIndex indicates a frequency resource of UE for transmitting an SR, and the description following sr-PUCCH-ResourceIndex represents that the field is an integer ranging from 0 to 2047; sr-ConfigIndex indicates a PUCCH time-domain resource for transmitting the SR, and a value of sr-ConfigIndex is an integer ranging from 0 to 157; and dsr-TransMax represents a maximum scheduling request transmission number.

Specifically, after the above operations, the terminal device may be configured with multiple BWPs, and each of the BWPs corresponds to the at least one scheduling request configuration (SR Configuration). In addition, each SR Configuration may correspond to one or more logical channels. Further, each logical channel may correspond to at most one SR Configuration.

For example, referring to Table 1, the network pre-configures a mapping relationship between LCHs and SR configurations corresponding to the BWP when configuring the BWP for the terminal.

For example, the network configures for the terminal three BWPs, i.e., BWP-A, BWP-B and BWP-C.

The network pre-configures a mapping relationship between logical channels and SR configurations corresponding to different BWPs. For example, as shown below, BWP-A corresponds to two SR configurations, BWP-B corresponds to three SR configurations and BWP-C corresponding to one SR configuration.

TABLE 1

| Logical Channel | BWP-A | BWP-B | BWP-C |
| --- | --- | --- | --- |
| LCH1 | SR-CONFIG-A-i | SR-CONFIG-B-i | SR-CONFIG-C-i |
| LCH2 | SR-CONFIG-A-i | SR-CONFIG-B-ii | SR-CONFIG-C-i |
| LCH3 | SR-CONFIG-A-ii | SR-CONFIG-B-iii | SR-CONFIG-C-i |

The network device further includes an activation information sending unit 53.

The activation information sending unit 53 is configured to send BWP activation information to the terminal device.

Herein, the BWP activation information is used to deactivate a first BWP currently used by the terminal device and activate a second BWP in the at least one BWP configured for the terminal device. The first BWP is different from the second BWP.

It can be seen from the above steps, before the BWP activation information is sent, the terminal device may acquire all configuration relationships as shown in Table 1. That is, the terminal device may acquire the mapping relationship between the logical channels and the scheduling request configurations and a mapping relationship between scheduling request configurations and BWPs in advance.

Furthermore, the activation information sending unit is configured to execute one of the following operations:

sending the BWP activation information to the terminal device through radio resource control (RRC) dedicated configuration signaling;

sending the BWP activation information to the terminal device through downlink control information (DCI);

sending the BWP activation information to the terminal device through a control element of a media access control layer; and sending the BWP activation information to the terminal device in a preset information format.

Correspondingly, after the activation information is sent, when reporting for an SR is triggered in a logical channel, the terminal device may select a PUCCH resource corresponding to the logical channel using the SR configuration mapped to the logical channel on the basis of the mapping relationship between the logical channels and the SR configurations, and send the SR on the selected PUCCH resource.

It can be seen that, with the above solution, multiple BWPs configured by a network for the terminal device may be received, and multiple scheduling request configurations may be configured for each of the BWPs correspondingly. Each scheduling request configuration has a mapping relationship with the logical channel.

In this way, the terminal device can correctly send an SR even if the mapping relationship is invalid when the terminal device switches the BWP, thereby ensuring system processing efficiency.

Figure 6:
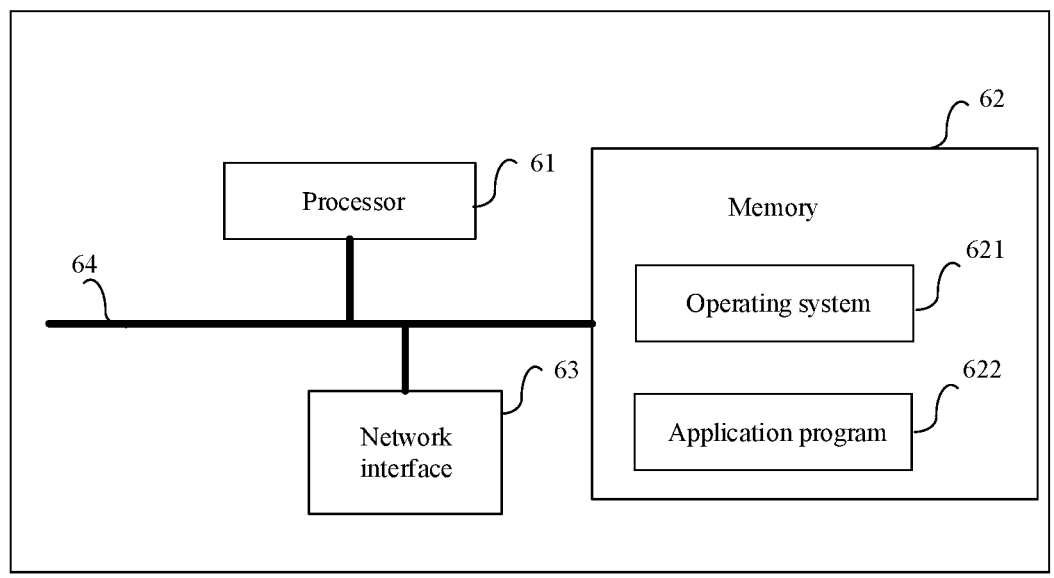
FIG. 6 is a schematic diagram showing a hardware structure according to an embodiment of the disclosure.

A hardware composition structure of a terminal device is further provided according to an embodiment of the disclosure, which includes at least one processor 61, a memory 62 and at least one network interface 63 as shown in FIG. 6. All components are coupled together through a bus system 64. It can be understood that the bus system 64 is configured to implement connection communication between these components. The bus system 64 includes a power bus, a control bus and a state signal bus, in addition to a data bus. However, for clear description, various buses in FIG. 6 are represented as the bus system 64.

It can be understood that the memory 62 in the embodiment of the disclosure may be a volatile memory or a nonvolatile memory, or may include both the volatile memory and the nonvolatile memory.

In some implementation, the memory 62 stores the following elements: executable modules or data structures, or a subset thereof or an extended set thereof. The extended set includes an operating system 621 and an application program 622.

Herein, the processor 61 is configured to receive at least one bandwidth part (BWP) configured by a network side, and receive at least one scheduling request configuration configured for each of the BWP by the network side. The SR configuration has a mapping relationship with a logical channel.

Specifically, the terminal device may process the steps of the method in the above first embodiment, which are not described repeatedly herein.

A network device is provided according to an embodiment of the disclosure, which includes a processor and a memory configured to store a computer program capable of being run in the processor.

Herein, the processor is configured to execute the steps of the method in the above embodiment when running the computer program, which are not described repeatedly herein.

A computer storage medium is provided according to an embodiment of the disclosure, in which a computer-executable instruction is stored. The computer-executable instruction implements the steps of the method in the above first or second embodiment when being executed.

When being implemented in the form of software function module and sold or used as an independent product, the above device according to the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including multiple instructions configured to enable a computer device (which may be a personal computer, a server, network equipment or the like) to execute all or a part of the method in each embodiment of the disclosure. The above storage medium includes: various media capable of storing program codes such as a U-disk, mobile storage equipment, an ROM, a magnetic disk or an optical disk. In this way, the embodiments of the disclosure are not limited to a specific combination of hardware and software.

Correspondingly, a computer storage medium is further provided according to an embodiment of the disclosure, in which a computer program is stored. The computer program is configured to execute the data scheduling method of the embodiments of the disclosure.

Although the preferred embodiments of the disclosure have been disclosed for the exemplary purposes, those skilled in the art may realize that various improvements, additions and replacements are also possible. Therefore, the scope of the disclosure should not be limited to the abovementioned embodiments.

The invention claimed is:

1. A method for configuring a scheduling request, applied to a terminal device and comprising:
receiving at least one bandwidth part (BWP) configured by a network side, wherein the at least one BWP comprises: numerology indicating a basic parameter set and indicating a carrier spacing (SCS), a center frequency point and a bandwidth;
receiving at least one scheduling request configuration configured by the network side for each of the at least one BWP, wherein the scheduling request configuration has a mapping relationship with a logical channel;
receiving a single BWP activation message sent by the network side, wherein the single BWP activation message is used to perform both a deactivation of a first BWP currently used by the terminal device and an activation of a second BWP in the at least one BWP configured for the terminal device, wherein the first BWP is different from the second BWP;
determining the scheduling request configuration corresponding to the second BWP on the basis of the second BWP to be activated indicated in the single BWP activation message and the at least one scheduling request configuration configured for each of the at least one BWP; and
determining a logical channel mapped to the scheduling request configuration corresponding to the second BWP on the basis of the scheduling request configuration corresponding to the second BWP.

2. The method of claim 1, after determining the logical channel mapped to the scheduling request configuration corresponding to the second BWP on the basis of the scheduling request configuration corresponding to the second BWP, further comprising:
when reporting for a scheduling request (SR) is triggered in the logical channel, selecting a physical uplink channel resource corresponding to the logical channel on the basis of the scheduling request configuration mapped to the logical channel corresponding to the second BWP, and sending the SR on the selected physical uplink channel resource.

3. The method of claim 1, wherein the at least one scheduling request configuration comprises at least one of: a time domain resource, a frequency domain resource, or a scheduling request transmission number.

4. The method of claim 1, wherein the activated second BWP is a BWP using which the terminal device sends and receives data at a current moment.

5. A network device, comprising:
a processor;
a memory configured to store a processor-executable computer program; and
at least one network interface,
wherein the processor is configured to:
configure at least one bandwidth part (BWP) for a terminal device, wherein the at least one BWP comprises: numerology indicating a basic parameter set and indicating a carrier spacing (SCS), a center frequency point and a bandwidth;
configure at least one scheduling request configuration for each of the at least one BWP, wherein the scheduling request configuration has a mapping relationship with a logical channel; and
control the at least one network interface to send a single BWP activation message to the terminal device,
wherein the single BWP activation message is used to perform both a deactivation of a first BWP currently used by the terminal device and an activation of a second BWP in the at least one BWP configured for the terminal device, and is used to indicate the terminal device to determine the scheduling request configuration corresponding to the second BWP on the basis of the second BWP to be activated indicated in the single BWP activation message and the at least one scheduling request configuration configured for each of the at least one BWP, and determine a logical channel mapped to the scheduling request configuration corresponding to the second BWP on the basis of the scheduling request configuration corresponding to the second BWP; and
wherein the first BWP is different from the second BWP.

6. The network device of claim 5, wherein the processor is further configured to control the at least one network interface to perform one of operations as follows:
sending the single BWP activation message to the terminal device through radio resource control (RRC) dedicated configuration signaling;
sending the single BWP activation message to the terminal device through downlink control information;
sending the single BWP activation message to the terminal device through a control element of a media access control layer; and
sending the single BWP activation message to the terminal device in a preset information format.

7. The network device of claim 5, wherein the at least one scheduling request configuration comprises at least one of: a time domain resource, a frequency domain resource, or a scheduling request transmission number.

8. The network device of claim 5, wherein the activated second BWP is a BWP using which the terminal device sends and receives data at a current moment.

9. A terminal device, comprising:
a processor;
a memory configured to store a processor-executable computer program; and
at least one network interface,
wherein the processor is configured to control the at least one network interface to:
receive at least one bandwidth part (BWP) configured by a network side, wherein the at least one BWP comprises: numerology indicating a basic parameter set and indicating a carrier spacing (SCS), a center frequency point and a bandwidth;
receive at least one scheduling request configuration configured by the network side for each of the at least one BWP, wherein the scheduling request configuration has a mapping relationship with a logical channel; and receive a single BWP activation message sent by the network side, wherein the single BWP activation message is used to perform both a deactivation of a first BWP currently used by the terminal device and an activation of a second BWP in the at least one BWP configured for the terminal device, wherein the first BWP is different from the second BWP;

wherein the processor is further configured to:

determine the scheduling request configuration corresponding to the second BWP on the basis of the second BWP to be activated indicated in the single BWP activation message and the at least one scheduling request configuration configured for each of the at least one BWP, and determine a logical channel mapped to the scheduling request configuration corresponding to the second BWP on the basis of the scheduling request configuration corresponding to the second BWP.

10. The terminal device of claim 9, wherein the processor is further configured to control the at least one network interface to:

send a scheduling request (SR), wherein the processor is configured to, when reporting for the SR is triggered in the logical channel, select a physical uplink channel resource corresponding to the logical channel on the basis of the scheduling request configuration mapped to the logical channel corresponding to the second BWP, and send the SR on the selected physical uplink channel resource.

11. The terminal device of claim 9, wherein the at least one scheduling request configuration comprises at least one of: a time domain resource, a frequency domain resource, or a scheduling request transmission number.

12. The terminal device of claim 9, wherein the activated second BWP is a BWP using which the terminal device sends and receives data at a current moment.

* * * * *